(12) United States Patent
Duck et al.

(10) Patent No.: US 9,303,739 B2
(45) Date of Patent: Apr. 5, 2016

(54) LINEAR DRIVE FOR FURNITURE
(71) Applicant: DewertOkin GmbH, Kirchlengern (DE)
(72) Inventors: Heinrich Duck, Espelkamp (DE);
Jurgen Martin, Bunde (DE)
(73) Assignee: DewertOkin GmbH, Kirchlengern (DE)
( * ) Notice: Subject to any disclaimer, the term of this patent is extended or adjusted under 35 U.S.C. 154(b) by 32 days.
(21) Appl. No.: 14/357,290
(22) PCT Filed: Oct. 5, 2012
(86) PCT No.: PCT/EP2012/069758
§ 371 (c)(1),
(2) Date: May 9, 2014
(87) PCT Pub. No.: WO2013/068184
PCT Pub. Date: May 16, 2013
(65) Prior Publication Data
US 2014/0311265 A1 Oct. 23, 2014
(30) Foreign Application Priority Data

Nov. 9, 2011 (DE) .......................... 10 2011 086 037

(51) Int. Cl.
*F16H 25/12* (2006.01)
*F16H 25/20* (2006.01)
(52) U.S. Cl.
CPC ................ *F16H 25/12* (2013.01); *F16H 25/20* (2013.01); *F16H 25/2025* (2013.01); *F16H 2025/209* (2013.01); *F16H 2025/2065* (2013.01); *F16H 2025/2084* (2013.01); *Y10T 74/18576* (2015.01)
(58) Field of Classification Search
CPC . F16H 2025/209; F16H 25/2025; F16H 1/16; F16H 2025/2065; F16H 2025/2071; F16H 2025/2084; F16H 25/20; F16H 25/2454; F16H 2025/2031; F16H 2063/3063; F16H 2063/321; F16H 25/12; Y10T 74/18704; Y10T 74/18696; Y10T 403/32426; Y10T 74/18032; Y10T 74/18576; Y10T 74/19735; A61G 7/002; A61G 7/018; A61G 7/05; A61G 2203/12; A61G 7/012; A61G 7/015; B60N 2/233; B60N 2/123; H02K 7/06; A47C 20/041; F16D 13/04; F16D 2023/123; F16D 23/12

USPC ............ 74/89.45, 89.23, 89.38, 89.39, 89.33, 74/89.14, 89.26, 89.32, 425, 424.71, 441, 74/625, 424.75, 127, 500, 502, 55, 58; 297/344.1, 362.14, 362.11, 330; 5/616, 5/618, 613, 617, 600, 424, 611, 652; 188/162, 72.8, 2 D; 310/83; 192/36
See application file for complete search history.

(56) References Cited

U.S. PATENT DOCUMENTS 5,575,531 A * 11/1996 Gauger et al. ........... 297/362.11
5,865,272 A * 2/1999 Wiggins et al. ............. 185/40 R
(Continued)

FOREIGN PATENT DOCUMENTS

DE 19729282 A1 1/1998
DE 19634308 A1 2/1998
(Continued)

OTHER PUBLICATIONS

Int'l Search Report issued Dec. 6, 2012 in Int'l Application No. PCT/EP2012/069758.
(Continued)

*Primary Examiner* — William Kelleher
*Assistant Examiner* — Leonard J Archuleta
(74) *Attorney, Agent, or Firm* — Panitch Schwarze Belisario & Nadel LLP (57) ABSTRACT

An electromotive linear drive, in particular for adjusting movably mounted parts of lounging and seating furniture, has a drive motor, a threaded spindle, a speed-reducing gear unit arranged between the drive motor and the threaded spindle, and a spindle nut (9) located on the threaded spindle. The spindle nut is optionally lockable in the direction of rotation and movable in the axial direction of the threaded spindle, depending on the direction of rotation of the threaded spindle. A lifting element can be driven by the axial movement of the spindle nut to adjust the movable furniture parts. Such a linear drive has a simple design, is easy to assemble and operate, and guarantee a robust mounting arrangement for the drive parts.

16 Claims, 7 Drawing Sheets

(56) References Cited

U.S. PATENT DOCUMENTS

| | | | |
|---|---|---|---|
| 5,918,939 A * | 7/1999 | Magadanz | 297/378.12 |
| 6,237,433 B1 * | 5/2001 | Rodrigues | 74/89.39 |
| 6,240,800 B1 | 6/2001 | Bokamper et al. | |
| 8,281,677 B2 | 10/2012 | Duck et al. | |
| 2003/0075963 A1 * | 4/2003 | Oberbeck | 297/344.1 |
| 2014/0215717 A1 * | 8/2014 | Rigsby et al. | 5/613 |

FOREIGN PATENT DOCUMENTS

| | | |
|---|---|---|
| DE | 29811566 U1 | 8/1998 |
| DE | 19752234 A1 | 6/1999 |
| DE | 202005002585 U1 | 5/2005 |
| DE | 102004058152 B3 | 6/2006 |
| DE | 202007015811 U1 | 3/2009 |
| EP | 0968675 B1 | 1/2003 |
| EP | 2131068 A1 | 12/2009 |
| WO | 2006087365 A2 | 8/2006 |
| WO | 2009039853 A2 | 4/2009 |

OTHER PUBLICATIONS

Search Report issued May 3, 2012 in DE Application No. 10 2011 086 037.1.
Int'l Preliminary Report on Patentability issued May 22, 2014 in Int'l Application No. PCT/EP2012/069758.

* cited by examiner

LINEAR DRIVE FOR FURNITURE

CROSS-REFERENCE TO RELATED APPLICATIONS

This application is a Section 371 of International Application No. PCT/EP2012/069758, filed Oct. 5, 2012, which was published in the German language on May 16, 2013, under International Publication No. WO 2013/068184 A1 and the disclosure of which is incorporated herein by reference.

BACKGROUND OF THE INVENTION

The invention concerns an electric motor-actuated linear drive, in particular for adjusting moveably mounted parts of lying and seating furniture, including for the medical sector like rehabilitation organizations, care beds, etc. The drive comprises a drive motor, a threaded spindle, a speed reduction gear arranged between the drive motor and the threaded spindle, a spindle nut which is carried on the threaded spindle and which can be selectively arrested in the direction of rotation and which is displaceable in the axial direction of the threaded spindle in dependence on the direction of rotation of the threaded spindle, and a stroke element drivable by the axial movement of the spindle nut for adjusting the moveable furniture parts.

Such an electric motor-actuated linear drive can be used both as an individual drive and also as a dual drive.

European Patent EP 0 968 675 B1 already discloses an individual or dual drive provided, in particular, for articles of furniture in the hospital sector and/or the care sector. In the case of this known linear drive a, which is carried on a motor shaft and which is in engagement with a worm gear, is provided as the speed reduction gear. The worm gear is mounted rotatably on a guide body, which is arranged fixedly on the threaded, and on which a coupling wheel is guided non-rotatably but axially displaceably. When the coupling wheel is coupled to the worm gear, the threaded spindle is driven while in the uncoupled condition the threaded spindle is stationary. Arranged non-rotatably on the threaded spindle is a spindle nut, which is connected to a stroke element and which, in dependence on the direction of rotation of the threaded spindle, is displaced in the axial direction and drives the stroke element serving to actuate the moveable furniture parts.

Such a drive mechanism has admittedly already proven its worth in practice, but such a mechanism is relatively complicated and expensive and cannot be loaded just as may be desired.

BRIEF SUMMARY OF THE INVENTION

Therefore the object of the invention is to provide a linear drive which is of a simple structure, which can be easily assembled and operated, and which ensures robust mounting for the drive components.

According to the invention the object is attained in that the drive wheel of the speed reduction gear is fixedly connected to the threaded spindle. There is provided a coupling element which is supported on the gear housing or on a housing portion connected thereto and which co-operates with the spindle nut. The spindle nut is provided at its peripheral region with at least two abutment surfaces facing in opposite peripheral directions, the coupling element is moveable in a direction towards the peripheral region of the spindle nut and away from same, wherein in the coupled condition it co-operates with the abutment surfaces of the spindle nut. The coupling element is of a bar-shaped configuration and extends along the entire stroke length of the spindle nut.

The structure according to the invention is of a relatively simple structure and can be heavily loaded, since the abutment surfaces of the spindle nut in operation and also in the stoppage times bear constantly against the bar-shaped coupling element, which is supported on the gear housing, and thereby afford a stable holding action. It is only for high-speed adjustment or in the event of a power failure that the coupling element is released by hand, so that the lifted furniture parts easily and without any problem move downwardly of their own accord, due to their weight or can be moved manually into the desired position.

International patent application Publication WO 2006/087365 A2 already discloses a possible way of blocking a spindle nut in the peripheral direction by a wrap spring brake and moving it in the axial direction by rotation of the threaded spindle. That known construction is comparable to a certain extent with the very robust and loadable structure of the construction according to the invention, but it is markedly more complicated and expensive in terms of assembly and structure. On the other hand, the construction in accordance with WO 2006/087365 A2 affords in relation to the present invention the possibility of high-speed adjustment by a frictionally engaging coupling element, which is formed by a wrap spring, and wherein the adjustment load acting on the linear drive can be adjusted selectively faster or slower by the coupling element which is manually controllable and can thus be delicately sensitively released. The object of the present invention is also to provide a robust capability of uncoupling and coupling, in comparison with that state of the art, which is adapted to be switchable while the robustness of the speed reduction gear remains unchanged.

The bar-shaped coupling element which extends along the entire stroke length of the spindle nut can be moveable radially relative to the spindle nut and is desirably guided in the gear housing.

Preferably the bar-shaped coupling element is however mounted pivotably in the gear housing and can move with a radial component in a direction towards the spindle nut and away from same.

Profile portions which are arcuate in cross-section at least in some regions can adjoin the bar-shaped coupling element, wherein the ends of the arcuate profile portions are supported at a contact surface provided in the gear housing. Such a support option affords a particularly robust structure with which the coupling element can withstand even relatively high forces.

In addition hump-shaped projections can be provided in the gear housing, wherein the arcuate profile portions of the coupling element embrace same in positively locking relationship in the coupled condition. That also substantially increases the load-bearing capability of the coupling element operatively connected to the spindle nut.

The spindle nut is desirably fixedly coupled by a ball bearing or axial thrust bearing to the stroke element, which is mounted in the gear housing axially displaceably but non-rotatably.

To achieve so-called high-speed adjustment, an actuating lever which is pivotable by hand or by Bowden cables can be provided externally on the gear housing for coupling and uncoupling the bar-shaped coupling element.

The bar-shaped coupling element is desirably spring-loaded in a direction towards its coupled position, which is the normal position in operation, so that uncoupling takes place in opposition to the acting spring force. Upon subsequent release of the actuating lever, the bar-shaped coupling element, by virtue of the spring loading, latches again into the coupled position in which the spindle nut is blocked in respect of rotation thereof To couple and uncouple the coupling element, the actuating lever can be connected to a slide element which is moveable in the axial direction of the threaded spindle and which is provided with inclined run-on surfaces, against which bear cams of the bar-shaped coupling element. The bar-shaped coupling element can be reciprocated between its coupled and uncoupled positions by the longitudinal displacement of the slide element, that is caused with the actuating lever.

A motion deflection means is thus formed, so that advantageously the actuating lever is arranged in slim relationship on the gear housing and is moved and guided alongside same, while the direction of movement of the coupling element occurs transversely to the direction of movement of the lever. That provides a compact structure, wherein both direct manual actuation and also remote actuation by a Bowden cable can extend slimly and alongside the gear housing and can be arranged on the gear housing.

Upon lifting of the cams by the inclined run-on surfaces of the slide element, the coupling element can be moved into the uncoupled position against the spring force. Upon the lowering movement of the cams of the coupling element, it is moved into the coupled position again by the spring force.

To facilitate the coupling process the spindle nut at its periphery can have a plurality of and preferably four recesses, at the edge regions of which are provided the respective contact surfaces facing in opposite directions. Thus, there are provided four coupling regions distributed over the periphery of the spindle nut, for latching engagement of the bar-shaped coupling element.

To ensure high-speed adjustment, particularly in the case of a power failure, without any problem, the thread pitch of the threaded spindle and of the spindle nut can preferably be so sized that no self-locking action occurs.

In addition, the speed reduction gear can also be non-self-locking but can be designed with a high level of braking action.

To increase the braking action a brake can additionally be operatively connected to the spindle or to the speed reduction gear or can be arranged thereon. Such a brake is preferably in the form of a frictionally engaging brake and can have a wrap band, brake shoes, brake pads, or the like, and is preferably in the form of a wrap spring brake.

The speed reduction gear preferably comprises a worm carried on the motor shaft and a worm gear, which serves as the drive wheel of the threaded spindle and which is fixedly connected to the threaded spindle.

The stroke element co-operating with the spindle nut is desirably operatively connected to a lever mechanism, which pivots an actuating shaft for adjustment of the corresponding moveable furniture parts, or moves a furniture component connected thereto relative to another furniture component directly or by interposed levers.

Assuming that the drive wheel of the speed reduction gear is fixedly connected to the threaded spindle and the stroke element is non-rotatably guided in the axial direction of the threaded spindle, the spindle nut can alternately also be coupleable to the stroke element in such a way that it is selectively non-rotatably connected thereto or released therefrom.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
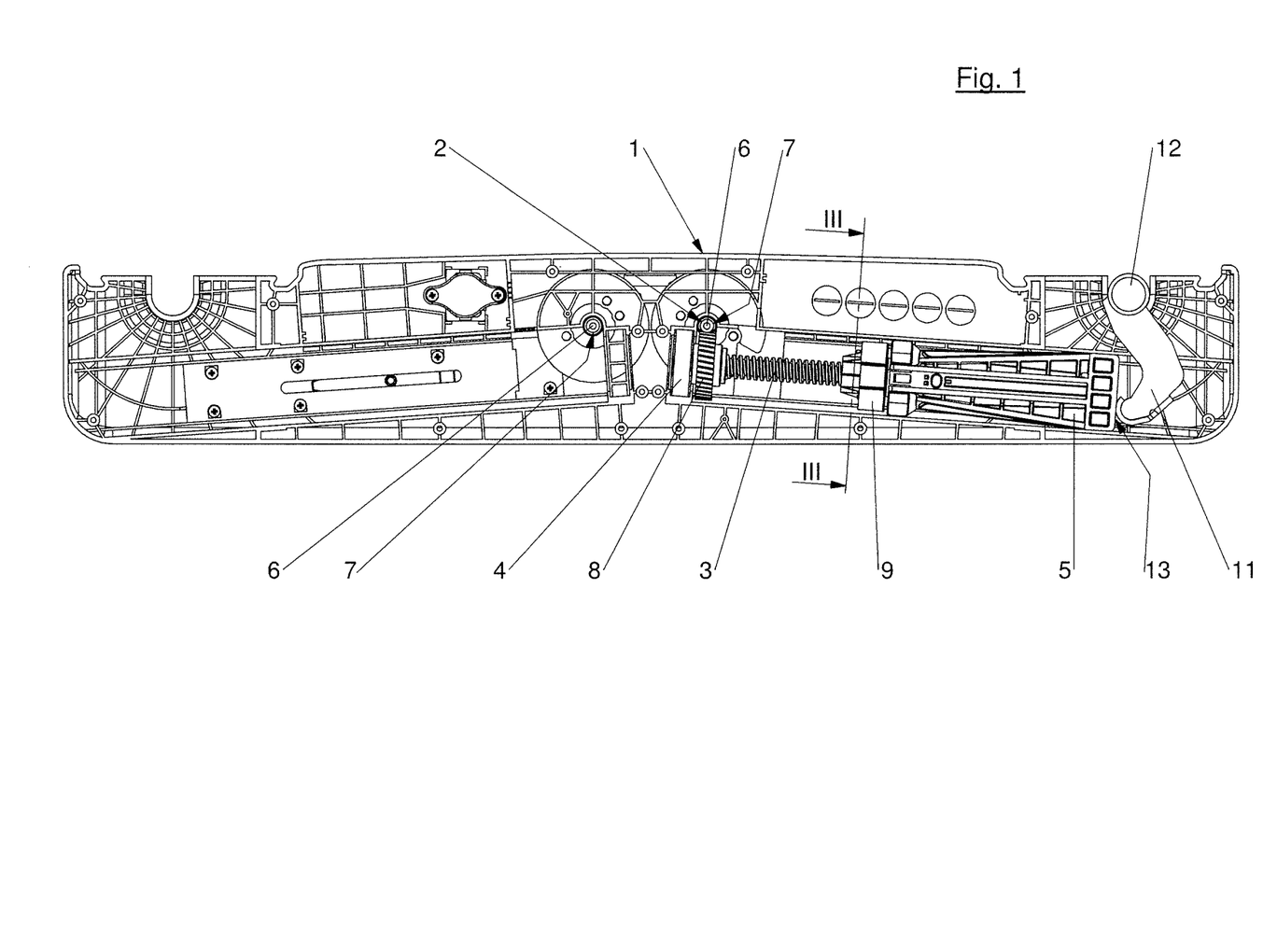
FIG. 1 is a longitudinal section through a linear dual drive according to an embodiment of the invention.

In the section shown in FIG. 1 through a linear dual drive, the two regions shown at right and left are identical. Therefore, only the structural elements arranged in the right-hand part of the gear housing 1 are described.

A motor (not shown) drives a threaded spindle 3 by a speed reduction gear 2. At its left-hand end the threaded spindle 3 is mounted in a bearing 4, preferably a ball bearing, in the gear housing 1. The opposite end of the threaded spindle 3 is supported by a stroke element 5, which is of a substantially square cross-section and is guided axially slidably in the gear housing 1.

Of the motor (not shown) the drawing shows only the output shaft 6 on which a worm 7 is non-rotatably arranged. The worm is in engagement with a worm gear 8, which is fixed non-rotatably and also axially immoveably on the threaded spindle 3.

Figure 2:
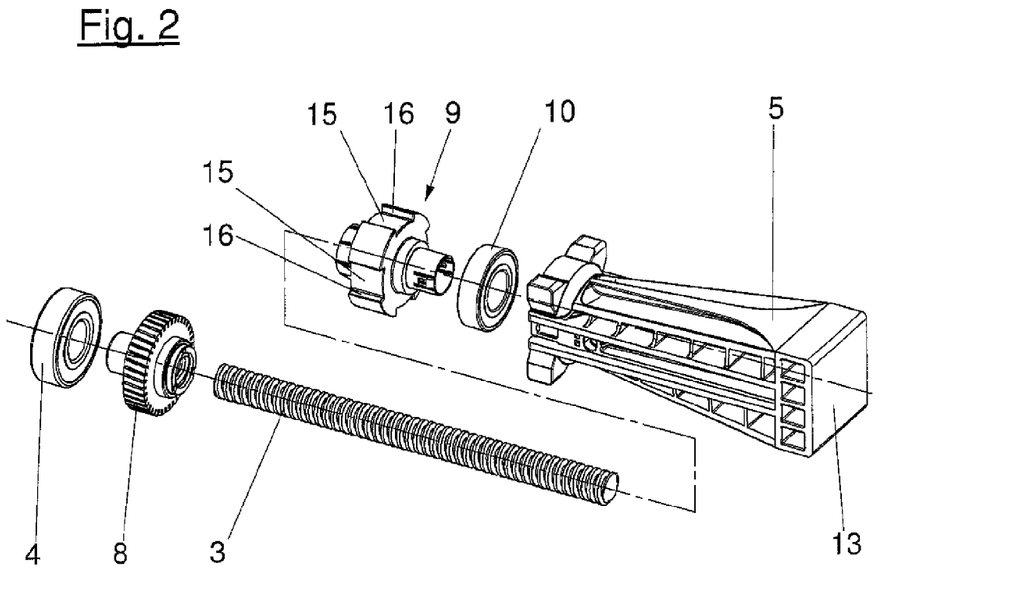
FIG. 2 is an exploded perspective view of the threaded spindle of an embodiment of the invention with the structural parts connected thereto.

In addition, carried on the threaded spindle 3 is a spindle nut 9 which, as can be seen from FIG. 2, is rotatably connected to the stroke element 5 by a ball bearing 10, but fixedly in the axial direction.

If the spindle nut 9 is blocked in the peripheral direction, it is moved to and fro in the axial direction in dependence on the direction of rotation of the threaded spindle 3 and thereby displaces the stroke element 5.

The stroke element 5 is operatively connected to a lever mechanism 11, which pivots an actuating shaft 12 for adjustment of the corresponding moveable furniture parts. When the stroke element 5 is moved towards the right in the drawing, the lever mechanism 11 is pivoted towards the right and thereby rotates the actuating shaft 12 to lift corresponding furniture parts in the counter-clockwise direction. When the stroke element 5 moves towards the left, the previously lifted furniture parts press downwardly under their own weight and pivot the actuating shaft 12 as well as the lever mechanism 11 bearing against the right-hand end face 13 of the stroke element 5, in the clockwise direction.

Motor-actuated advance of the spindle nut 9 for lifting and lowering the moveable furniture parts is effected only when the spindle nut 9 is held fast in the peripheral direction on the driven threaded spindle 3. Blocking of the spindle nut 9 is effected by a coupling element 14 which is shown in two positions in FIGS. 3 and 4.

Figure 3:
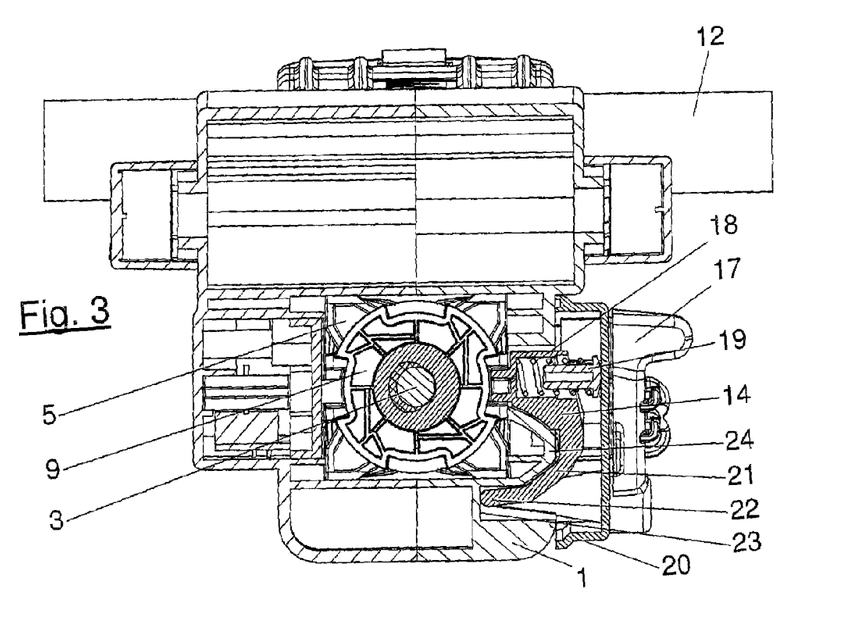
FIG. 3 is a sectional view on an enlarged scale along line in FIG. 1, in the coupled condition of the spindle nut.

FIG. 3 shows the normal position of the coupling element 14. Shown in the center of the drawing in the background is the approximately square stroke element 5 and in front thereof the spindle nut 9, which is carried on the threaded spindle 3 and which is in engagement with its female thread with the male thread of the threaded spindle 3.

In the embodiment shown in the drawing, the spindle nut 9 is of a substantially circular configuration and at its periphery has four recesses 15, which are respectively displaced through 90° relative to each other and which can be particularly clearly seen in FIG. 2. The recesses 15 are each provided with two mutually opposite abutment surfaces 16 cooperating with the coupling element 14.

In the coupled condition the coupling element 14 engages into the respective recess 15 in the spindle nut 9 so that, upon further rotation of the spindle nut 9, one of the two abutment surfaces 16 comes to bear against the coupling element 14, depending on the respective direction of rotation of the threaded spindle 3. From the moment when one of the abutment surfaces 16 of the spindle nut 9 comes to bear against the coupling element 14, the spindle nut 9 is held fast in the peripheral direction and as a result, with the threaded spindle 3 rotating, is moved in one direction or the other, depending on the respective direction of rotation of the threaded spindle 3. Upon axial movement thereof the spindle nut 9 entrains the stroke element 5, so that as a result the furniture parts to be moved are either lifted or lowered.

Figure 4:
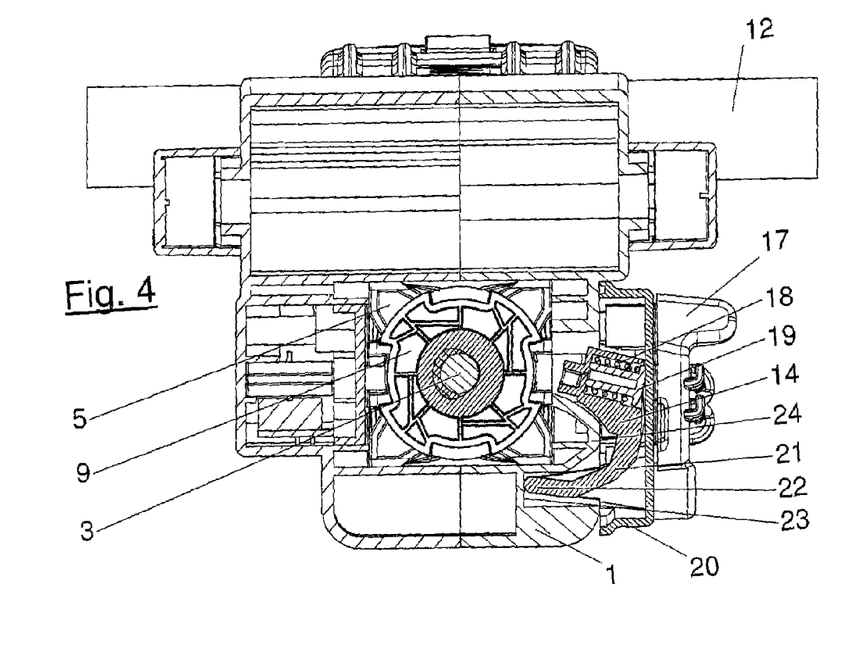
FIG. 4 is the same section as FIG. 2 in the uncoupled condition of the spindle nut.

FIG. 4 shows the uncoupled position of the coupling element 14, in which the coupling element 14 assumes a position of being refracted from the recess 15, so that none of the abutment surfaces 16 of the spindle nut 9 bear against the coupling element 14. In that operating condition the spindle nut 9 can rotate jointly with the threaded spindle 3, that is to say this is an idle condition.

That position of the coupling element 14, however, primarily provides that high-speed lowering of the furniture parts or a lowering movement of the furniture parts, in the event of a power failure in which the threaded spindle 3 cannot be driven, is possible. As the thread of the threaded spindle 3 does not produce a self-locking action, the nut can rotate freely on the stationary threaded spindle 3 upon retraction of the coupling element 14 out of the recess 15, due to the pressure of the furniture parts which are to be moved downwardly and which press on the stroke element 5 by the lever mechanism 11, whereby the nut moves towards the left in FIG. 1.

The movement of the coupling element 14 between a coupled position and an uncoupled position is effected by an actuating lever 17, the mode of operation of which is described hereinafter.

The coupling element 14 can be reciprocated between two extreme positions shown in FIGS. 3 and 4 by suitable pivotal movement of the actuating lever 17.

The coupled position shown in FIG. 3 is the normal position in which the spindle nut 9 is fixed in the direction of rotation. In this case the coupling element 14 is held in the coupled position by a compression spring 18, wherein the spring is supported by a guide pin 19 at the inside surface of a cover hood 20, which is screwed into the gear housing 1. When the coupling element 14 is pivoted back into the uncoupled position shown in FIG. 4, the compression spring 18 is stressed so that, upon corresponding pivotal movement of the actuating lever 17, at a given time, it can move back into its normal position shown in FIG. 3 again.

Figure 5:
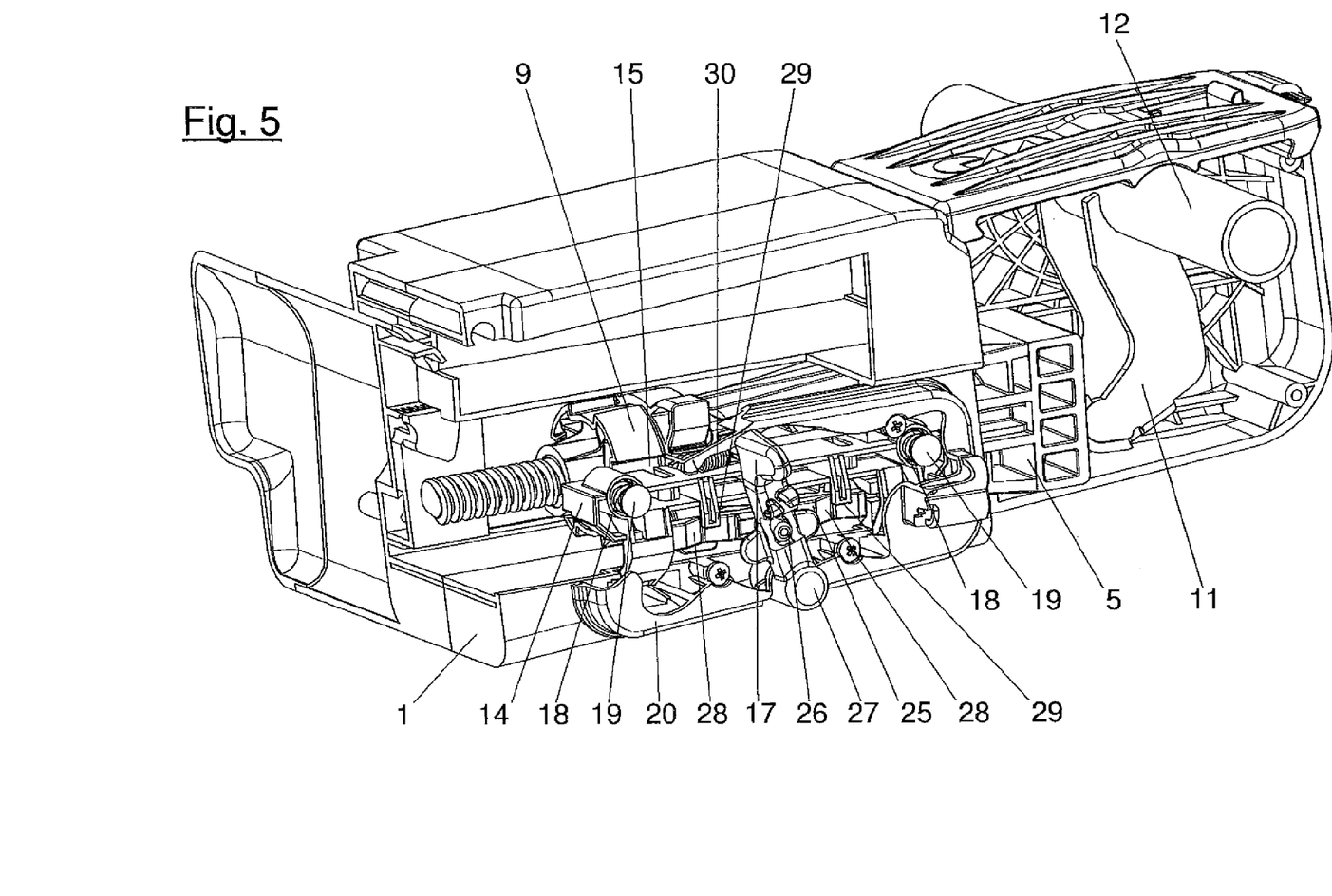
FIG. 5 is a perspective view on an enlarged scale of a portion from FIG. 1 in the region of the spindle nut, the coupling element being in engagement with the spindle nut.
Figure 6:
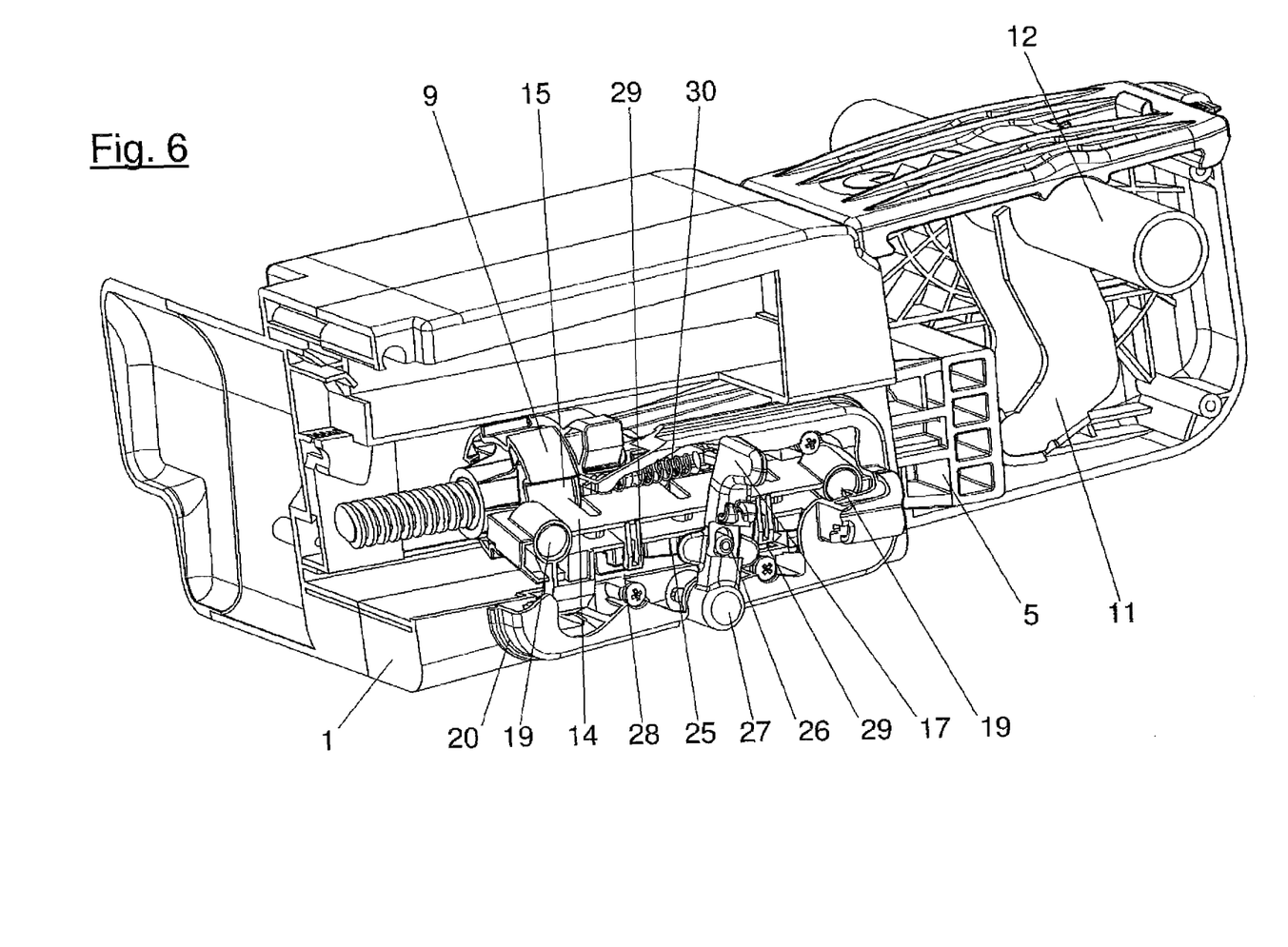
FIG. 6 is the same view as FIG. 4 in the uncoupled condition of the spindle nut.

In the embodiment shown in the drawing, the coupling element 14 is of a bar-shaped configuration and, as can be seen in particular from FIGS. 5 and 6, extends along the entire intended stroke travel of the spindle nut 9.

In the position of the bar-shaped coupling element 14 as shown in FIGS. 3 and 5, the coupling element 14 engages into one of the recesses 15 in the spindle nut 9 along the entire possible stroke travel of the spindle nut 9, so that the spindle nut 9 is constantly blocked in the direction of rotation. With the coupling element 14 in that position, therefore, the spindle nut 9 is moved towards the right or the left in dependence on the direction of rotation of the threaded spindle 3, so that the furniture parts to be moved can be raised by electric motor actuation by the stroke element 5, the lever mechanism 11 as well as the actuating shaft 12, or can be lowered in specifically targeted fashion.

As can be seen in particular from FIGS. 3 and 5, the bar-shaped coupling element 14 has two arcuate profile portions 21, which are arranged at a spacing from each other and whose ends 22 are supported at a contact surface 23 provided in the gear housing 1.

At least in the region of the arcuate profile portions 21, provided in the gear housing 1 are hump-shaped projections 24, against which the arcuate profile portions 21 closely bear in positively locking relationship in the coupled condition of the coupling element 14, as can be seen in particular from FIG. 3. That configuration provides a highly stable and robust holding action for the bar-shaped coupling element 14 on the gear housing 1, so that the linear drive according to the invention can thereby transmit extremely high forces.

It will be appreciated that alternatively it is also possible to envisage other coupling options by the provision of coupling elements which are not pivotable but are displaceable exclusively radially in the gear housing 1. It is also conceivable for the coupling elements to be provided on the stroke element 5 and for the rotational movement of the spindle nut 9 on the threaded spindle 3 to be blocked by axial displacement and/or radial displacement of the coupling elements.

The pivotable arrangement of the coupling element 14 as shown in the drawing is, however, an optimum embodiment which is of a simple structure and is capable of also transmitting relatively high forces.

The above-mentioned actuating lever 17, which can be pivoted by hand or over a greater distance by Bowden cables, actuates an elongate slide element 25, which can be seen in FIGS. 5, 5a and 6, 6a. Disposed on the slide element 25 approximately at the center thereof is a projecting round pin 26, which engages through an opening in the actuating lever 17 and which reciprocates the slide element 25 parallel to the threaded spindle 3 upon pivotal movement of the actuating lever 17 about its pivot axis 27.

The slide element 25 is provided at two mutually remote locations with depressions, which respectively form inclined run-on surfaces 28.

In the region of the inclined run-on surfaces 28 the bar-shaped coupling element 14 has cams 29, which are raised or lowered upon movement of the slide element 25. Due to the raising and lowering movement of the cams 29 on the coupling element 14, the coupling element 14 is pivoted between the coupled and the uncoupled positions. When the cams 29 are in the region of the lowest position of the inclined run-on surfaces 28, as shown in FIGS. 3, 5 and 5a, that corresponds to the coupled normal position of the coupling element 14 in which the coupling element 14 is automatically held by virtue of the force of the compression springs 18.

Figure 5A:
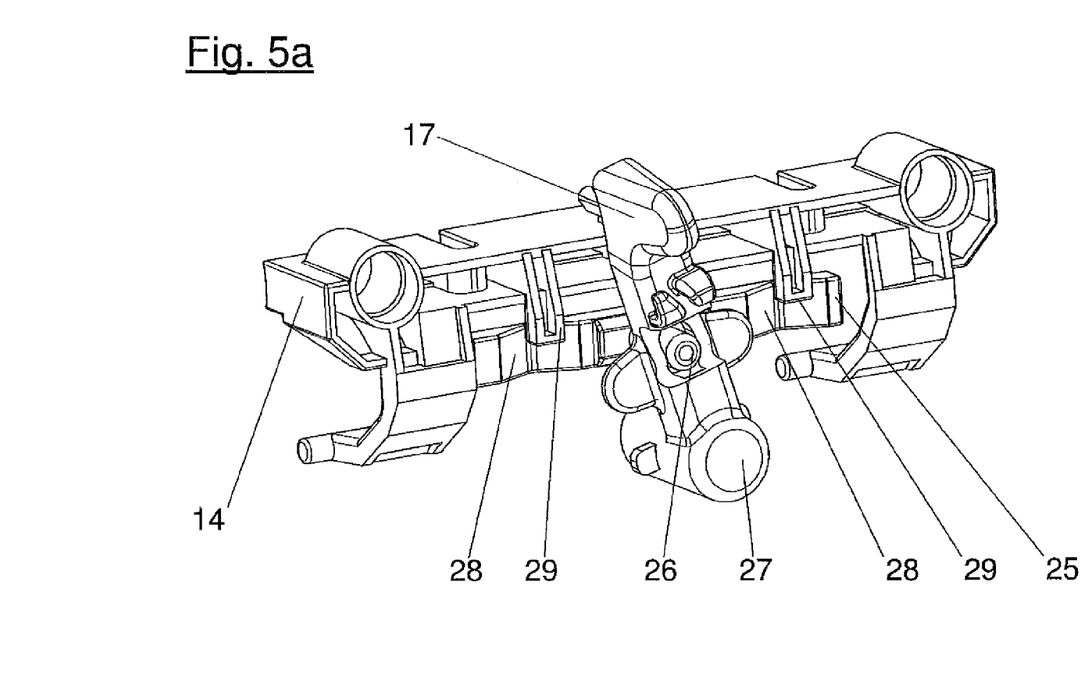
FIG. 5a is a perspective view on an even larger scale of the coupling element illustrated separately, with the slide element as well as the actuating lever serving to move the slide element, in accordance with the position shown in FIG. 5.
Figure 6A:
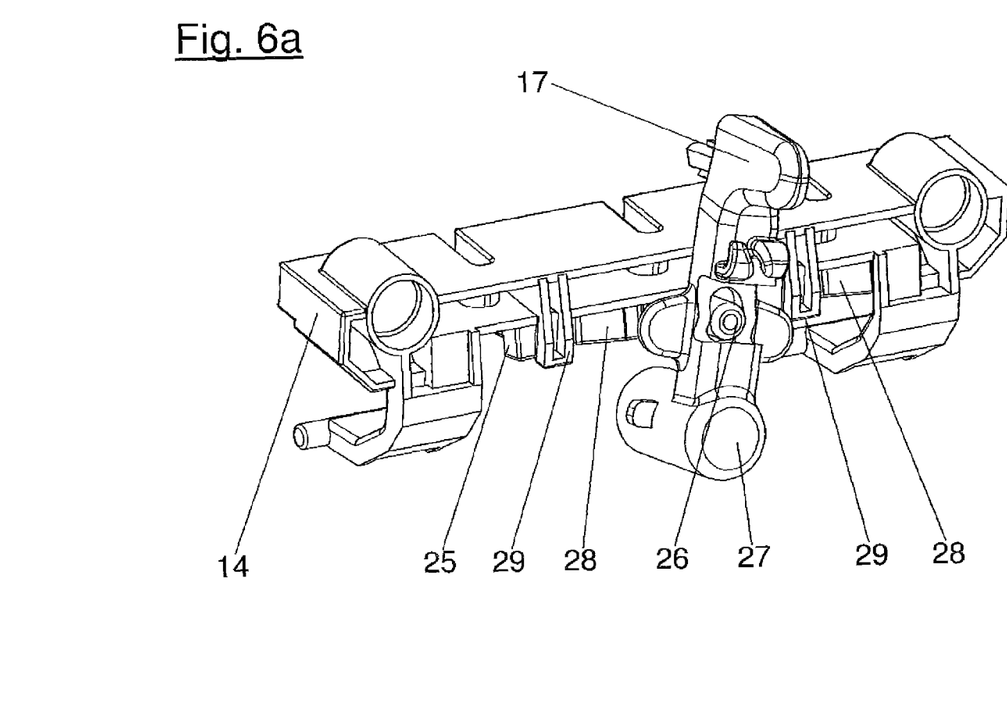
FIG. 6a is the same view as in FIG. 5a in the position shown in FIG. 6.

If the actuating lever 17 is pivoted out of the position shown in FIGS. 5 and 5a respectively against the force of a tension spring 30 towards the right into the position shown in FIGS. 6 and 6a, then the slide element 25 is also displaced towards the right by the pin 26, so that the cams 29 run up the inclined run-on surfaces 28, thereby causing a pivotal movement of the bar-shaped coupling element 14 into the uncoupled position.

If therefore, without actuating the motor, high-speed lowering movement of the raised furniture parts is to be effected, the actuating lever 17 is pivoted into the right-hand position shown in FIGS. 6 and 6a, whereby the coupling element 14 is pivoted into the uncoupled position so that, under the weight of the raised furniture parts, the stroke element 5 is urged towards the left in the drawing by the actuating shaft 12 and the lever mechanism 11, and thereby the spindle nut 9 is caused to rotate so that it also moves towards the left on the stationary threaded spindle 3.

When pressure is no longer applied to the actuating lever 17, it moves back again into its position of being pivoted towards the left, which corresponds to the coupled position of the coupling element 14, due to the force of the tension spring 30. If then the motor is actuated and the threaded spindle 3 is caused to rotate, that involves specifically targeted raising and lowering of the moveable furniture parts by the electric motor-actuated linear drive.

The invention claimed is:

1. An electric motor-actuated linear drive for adjusting moveably mounted parts, the drive comprising:
   a drive motor,
   a threaded spindle,
   a speed reduction gear operatively engaging the drive motor and the threaded spindle, the speed reduction gear having a drive wheel fixedly connected to the threaded spindle,
   a spindle nut having at least two abutment surfaces in a peripheral region thereof and facing in opposite peripheral directions, the spindle nut being carried on the threaded spindle, and being selectively arrestable in a direction of rotation, and being displaceable in an axial direction of the threaded spindle in dependence on the direction of rotation of the threaded spindle,
   a stroke element drivable by the axial displacement of the spindle nut for adjusting the moveable parts, and
   a bar-shaped coupling element supported on a gear housing, or on a housing portion connected thereto, and engageable with the spindle nut, the coupling element being moveable in a direction toward the peripheral region of the spindle nut and away therefrom,
   wherein the coupling element engages the abutment surfaces of the spindle nut in a coupled position and the coupling element disengages from the abutment surfaces in an uncoupled position, and wherein the coupling element extends along an entire stroke length of the spindle nut.

2. The electric motor-actuated linear drive as set forth in claim 1, wherein the bar-shaped coupling element is mounted moveably radially relative to the spindle nut and in the gear housing.

3. The electric motor-actuated linear drive as set forth in claim 1, wherein the bar-shaped coupling element is mounted pivotably in the gear housing.

4. The electric motor-actuated linear drive as set forth in claim 3, wherein profile portions, which are arcuate in cross-section in at least some regions, adjoin the bar-shaped coupling element, and ends of the arcuate profile portions are supported at a contact surface provided in the gear housing.

5. The electric motor-actuated linear drive as set forth in claim 4, wherein hump-shaped projections are provided in the gear housing, and the arcuate profile portions of the coupling element embrace the projections in positively locking relationship in the coupled position.

6. The electric motor-actuated linear drive as set forth in claim 1, wherein the spindle nut is fixedly coupled to the stroke element by a ball bearing.

7. The electric motor-actuated linear drive as set forth in claim 1, wherein an actuating lever is provided externally on the gear housing, the actuating lever being pivotable by hand or by Bowden cables for coupling and uncoupling the bar-shaped coupling element.

8. The electric motor-actuated linear drive as set forth in claim 1, wherein the bar-shaped coupling element is spring-loaded in a direction toward the coupled position thereof.

9. The electric motor-actuated linear drive as set forth in claim 8, wherein the actuating lever is connected to a slide element moveable in the axial direction of the threaded spindle, the slide element being provided with inclined run-on surfaces, wherein cams are provided on the bar-shaped coupling element, which bear against the inclined run-on surfaces, and wherein the bar-shaped coupling element reciprocates between the coupled and uncoupled positions thereof by the axial displacement of the slide element, that is caused with the actuating lever.

10. The electric motor-actuated linear drive as set forth in claim 9, wherein when the cams are lifted by the inclined run-on surfaces of the slide element, the coupling element is moveable against the force of a spring into the uncoupled position, and upon downward movement of the cams of the coupling element, the coupling element is moveable into the coupled position by spring force.

11. The electric motor-actuated linear drive as set forth in claim 1, wherein the spindle nut includes four recesses in the peripheral region thereof, edge regions of the recesses being provided with the respective at least two abutment surfaces facing in opposite directions and cooperating with the coupling element.

12. The electric motor-actuated linear drive as set forth in claim 1, wherein thread pitch of the threaded spindle and the spindle nut are sized such that no self-locking action occurs.

13. The electric motor-actuated linear drive as set forth in claim 1, wherein the speed reduction gear is not self-locking.

14. The electric motor-actuated linear drive as set forth in claim 1, wherein the speed reduction gear has a worm carried on a motor shaft and a worm gear serving as a drive wheel and fixedly connected to the threaded spindle.

15. The electric motor-actuated linear drive as set forth in claim 1, wherein the stroke element is operatively connected to a lever mechanism, the stroke element pivoting the lever mechanism by axial movement of the stroke element and the lever mechanism being connected to an actuating shaft for adjusting the corresponding moveable parts.

16. The electric motor-actuated linear drive as set forth in claim 1, which is configured for adjusting moveably mounted parts of lying and seating furniture.

\* \* \* \* \*